(12) United States Patent
Woo et al.

(10) Patent No.: US 11,634,001 B2
(45) Date of Patent: Apr. 25, 2023

(54) PERSONAL MOBILITY AND CONTROL METHOD THEREOF

(71) Applicants: HYUNDAI MOTOR COMPANY, Seoul (KR); KIA CORPORATION, Seoul (KR)

(72) Inventors: Seunghyun Woo, Seoul (KR); Soobin Kim, Seoul (KR); Jae Yul Woo, Seoul (KR); Rowoon An, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 45 days.

(21) Appl. No.: 17/354,831

(22) Filed: Jun. 22, 2021

(65) Prior Publication Data

US 2022/0111696 A1    Apr. 14, 2022

(30) Foreign Application Priority Data

Oct. 14, 2020   (KR) .................. 10-2020-0132971

(51) Int. Cl.
*B60G 21/00* (2006.01)
*B62K 5/027* (2013.01)
*B62H 1/06* (2006.01)

(52) U.S. Cl.
CPC ............. *B60G 21/005* (2013.01); *B62H 1/06* (2013.01); *B62K 5/027* (2013.01); *B60G 2300/122* (2013.01); *B60G 2400/82* (2013.01); *B60G 2600/20* (2013.01); *B60G 2800/01* (2013.01); *B60G 2800/20* (2013.01)

(58) Field of Classification Search
CPC ............ B60G 21/005; B60G 2300/122; B60G 2600/20; B60G 2300/40; B62K 5/027; B60W 2300/367

See application file for complete search history.

(56) References Cited

U.S. PATENT DOCUMENTS

| | | | |
|---|---|---|---|
| 6,444,975 B1* | 9/2002 | Reusch | A01C 21/007 250/559.38 |
| 10,207,739 B2* | 2/2019 | Thompson | B60Q 1/0035 |
| 10,368,473 B2* | 8/2019 | Treinen | A01M 7/0082 |
| 11,433,703 B2* | 9/2022 | Budweil | B60B 35/1036 |
| 2011/0148053 A1* | 6/2011 | Motebennur | B62D 49/0678 280/6.16 |
| 2020/0215865 A1* | 7/2020 | Sirault | B62D 51/04 |
| 2021/0245821 A1* | 8/2021 | Crouzat | B62D 49/0607 |

* cited by examiner

*Primary Examiner* — Paul N Dickson
*Assistant Examiner* — Tiffany L Webb
(74) *Attorney, Agent, or Firm* — Slater Matsil, LLP

(57) ABSTRACT

A personal mobility and a control method are provided. The personal mobility includes: a main body; a front wheel mounted on the front end of the main body; a pair of rear wheels mounted on the rear end of the main body; an actuator configured to adjust a distance between the pair of rear wheels; an image data device mounted on the personal mobility and having a field of view outside of the personal mobility, the image data device configured to acquire image data; and a controller configured to determine at least one of user state information or external environment information based on the image data, and control the actuator to adjust the distance between the pair of rear wheels based on at least one of the user state information or the external environment information.

20 Claims, 10 Drawing Sheets

14: 14a, 14b
30: 30a, 30b
140: 140a, 140b

| EXTERNAL ENVIRONMENT INFORMATION | DISTANCE BETWEEN A PAIR OF REAR WHEELS |
|---|---|
| ROAD WIDTH DECREASE | DECREASE |
| ROAD SURFACE CURVATURE DEGREE INCREASE | INCREASE |

FIG. 8

| STATE | | WHETHER TO USE SUPPORT DEVICE |
|---|---|---|
| PARKING | LARGE ADJUSTMENT WIDTH | YES |
| | SMALL ADJUSTMENT WIDTH | NO |
| DRIVING | | NO |

PERSONAL MOBILITY AND CONTROL METHOD THEREOF

CROSS-REFERENCE TO RELATED APPLICATION

This application claims the priority to and the benefit of Korean Patent Application No. 10-2020-0132971, filed on Oct. 14, 2020, the disclosure of which is incorporated herein by reference in its entirety.

TECHNICAL FIELD

The present disclosure relates to personal mobility having one front wheel and a pair of rear wheels, and a control method thereof.

BACKGROUND

Recently, as the market for personal mobility, which is a small electric vehicle powered by electricity, is expanding, the number of users using personal mobility is increasing.

In general, personal mobility may be a two-wheel moving means including one front wheel and one rear wheel, or a three wheels moving means including one front wheel and two rear wheels.

Depending on the external environment, such as road width and road surface conditions, personal mobility of two wheels may reduce driving safety, and personal mobility of three wheels may reduce driving performance.

SUMMARY

Therefore, the present disclosure provides a personal mobility that provides a pair of rear wheels and adjusts the distance between the pair of rear wheels according to the external environment or user state, and a control method thereof.

In accordance with one aspect of the disclosure, a personal mobility includes: a main body; a front wheel mounted on a front end of the main body; a pair of rear wheels mounted on a rear end of the main body; an actuator configured to adjust a distance between the pair of rear wheels; an image data device mounted on the personal mobility and configured to acquire an image data of an outside of the personal mobility; and a controller configured to determine at least one of user state information or external environment information based on the image data, and control the actuator to adjust the distance between the pair of rear wheels based on at least one of the user state information or the external environment information.

The controller may be configured to control the actuator to increase the distance between the pair of rear wheels if an age of the user indicated by the user state information exceeds a predetermined age.

The controller may be configured to control the actuator to increase the distance between the pair of rear wheels if the user state information indicates a state in which the user grips an object.

The controller may be configured to control the actuator to increase the distance between the pair of rear wheels if a degree of curvature of a road surface indicated by the external environment information exceeds a predetermined degree of curvature.

The controller may be configured to control the actuator to decrease the distance between the pair of rear wheels if a width of a road indicated by the external environment information decreases.

The controller may be configured to determine a distance to be adjusted between the pair of rear wheels in proportion to a degree of information indicated by at least one of the user state information or the external environment information.

The personal mobility may further include: a support device mounted on the rear end of the main body, extended to separate the pair of rear wheels from a ground and pressing the ground.

The controller may be configured to control the support device so that the pair of rear wheels are separated from the ground, when the personal mobility is parked and the actuator is controlled to adjust the distance between the pair of rear wheels.

The controller may be configured to control the actuator to adjust the distance between the pair of rear wheels after the pair of rear wheels are separated from the ground.

The controller may be configured to control the actuator in a state in which the support device does not press the ground if the difference between the current distance between the pair of rear wheels and the determined distance to be adjusted is less than a predetermined value while the personal mobility is parked.

In accordance with another aspect of the disclosure, a control method of a personal mobility including a main body, a front wheel mounted on a front end of the main body, a pair of rear wheels mounted on a rear end of the main body, an actuator configured to adjust a distance between the pair of rear wheels and an image data device configured to acquire image data, includes: determining at least one of user state information or external environment information based on the image data; and controlling the actuator to adjust the distance between the pair of rear wheels based on at least one of the user state information or the external environment information.

The controlling the actuator may include: controlling the actuator to increase the distance between the pair of rear wheels if an age of the user indicated by the user state information exceeds a predetermined age.

The controlling the actuator may include: controlling the actuator to increase the distance between the pair of rear wheels if the user state information indicates a state in which the user grips an object.

The controlling the actuator may include: controlling the actuator to increase the distance between the pair of rear wheels if a degree of curvature of a road surface indicated by the external environment information exceeds a predetermined degree of curvature.

The controlling the actuator may include: controlling the actuator to decrease the distance between the pair of rear wheels if a width of a road indicated by the external environment information decreases.

The controlling the actuator may include: determining a distance to be adjusted between the pair of rear wheels in proportion to a degree of information indicated by at least one of the user state information or the external environment information.

The personal mobility may further include a support device mounted on the rear end of the main body, extended to separate the pair of rear wheels from a ground and pressing the ground.

The control method may further include: controlling the support device so that the pair of rear wheels are separated from the ground, when the personal mobility is parked and the actuator is controlled to adjust the distance between the pair of rear wheels.

The control method may further include: controlling the actuator to adjust the distance between the pair of rear wheels after the pair of rear wheels are separated from the ground.

The control method may further include: controlling the actuator in a state in which the support device does not press the ground if the difference between the current distance between the pair of rear wheels and the determined distance to be adjusted is less than a predetermined value while the personal mobility is parked.

DRAWINGS

These and/or other aspects of the disclosure will become apparent and more readily appreciated from the following description of the forms, taken in conjunction with the accompanying drawings of which:

FIG. 8 is a diagram illustrating a case in which a personal mobility according to an embodiment adjusts a distance between a pair of rear wheels using a support device.

DETAILED DESCRIPTION

Figure 1:
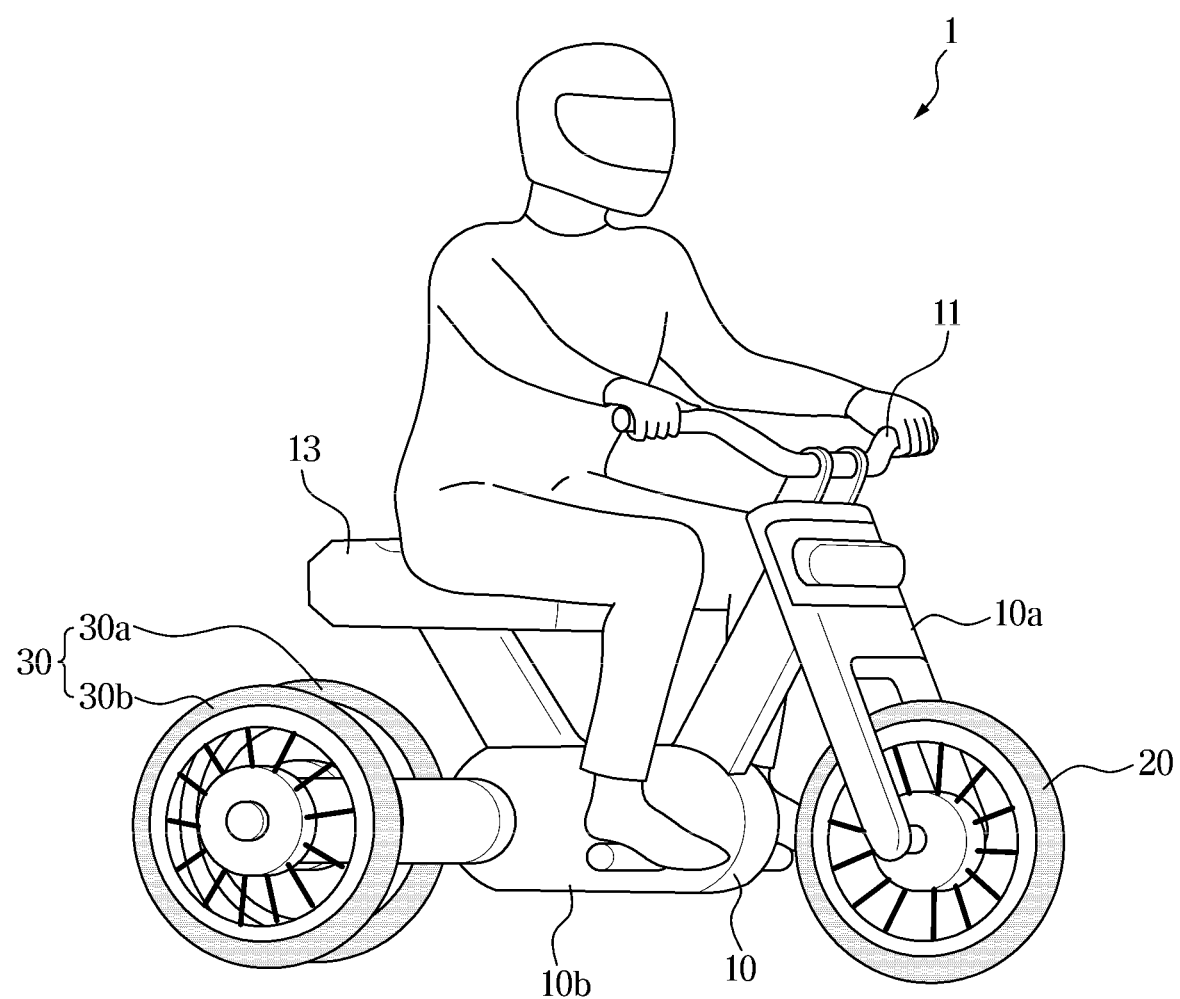
FIG. 1 is an external view of a personal mobility according to an embodiment.

Like reference numerals refer to like elements throughout the specification. Not all elements of forms of the disclosure will be described, and description of what are commonly known in the art or what overlap each other in the forms will be omitted.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

As used herein, the singular forms "a," "an" and "the" are intended to include the plural forms as well, unless the context clearly indicates otherwise.

As used herein, the terms "portion," "unit," "block," "member," and "module" refer to a unit that can perform at least one function or operation. For example, these terms may refer to at least one process which is performed by at least one piece of hardware such as a field-programmable gate array (FPGA) and an application specific integrated circuit (ASIC), and at least one piece of software stored in a memory or a processor.

An identification code is used for the convenience of the description but is not intended to illustrate the order of each step. Each of the steps may be implemented in an order different from the illustrated order unless the context clearly indicates otherwise.

Hereinafter, forms of a personal mobility and a control method thereof according to an aspect will be described in detail with reference to the accompanying drawings.

A personal mobility means a small mobility means for one person or two persons capable of driving with electric power such as an electric kickboard, an electric bicycle, and an electric wheel. Hereinafter, a structure of personal mobility according to an embodiment will be described in detail.

Figure 2:
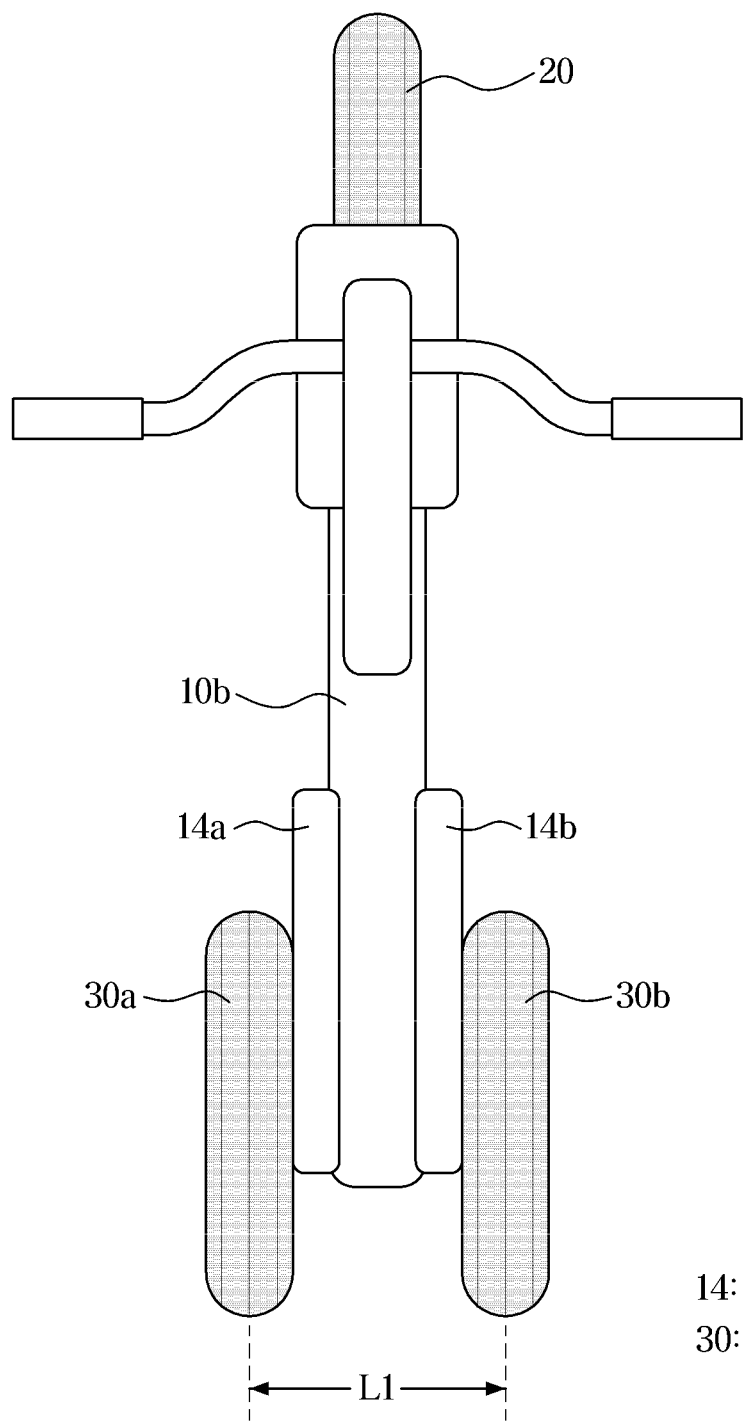
FIG. 2 is a top view of a case in which a personal mobility according to an embodiment adjusts a distance between a pair of rear wheels to be narrow.
Figure 3:
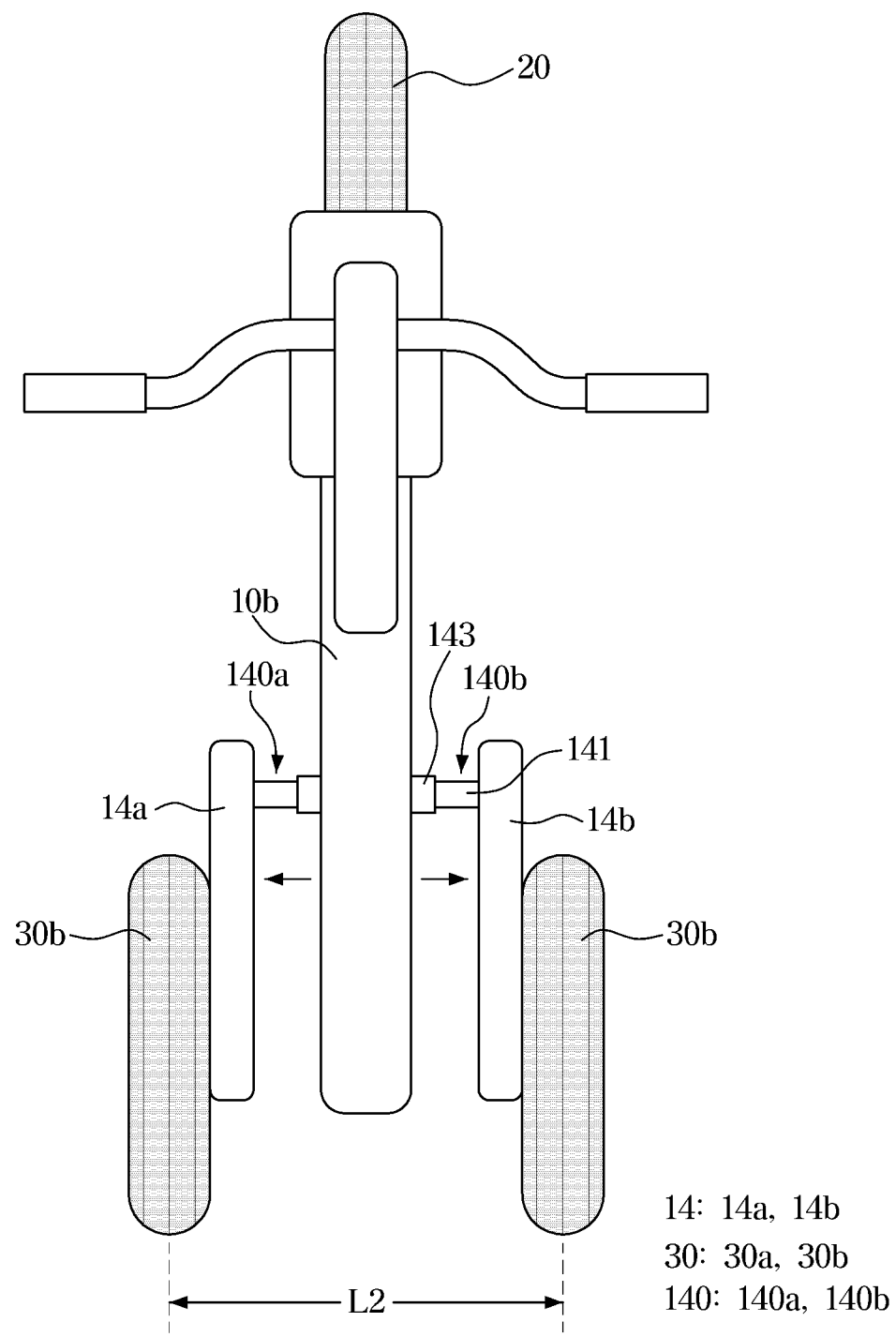
FIG. 3 is a top view of a case in which a personal mobility according to an embodiment adjusts a distance between a pair of rear wheels to be wide.
Figure 4:
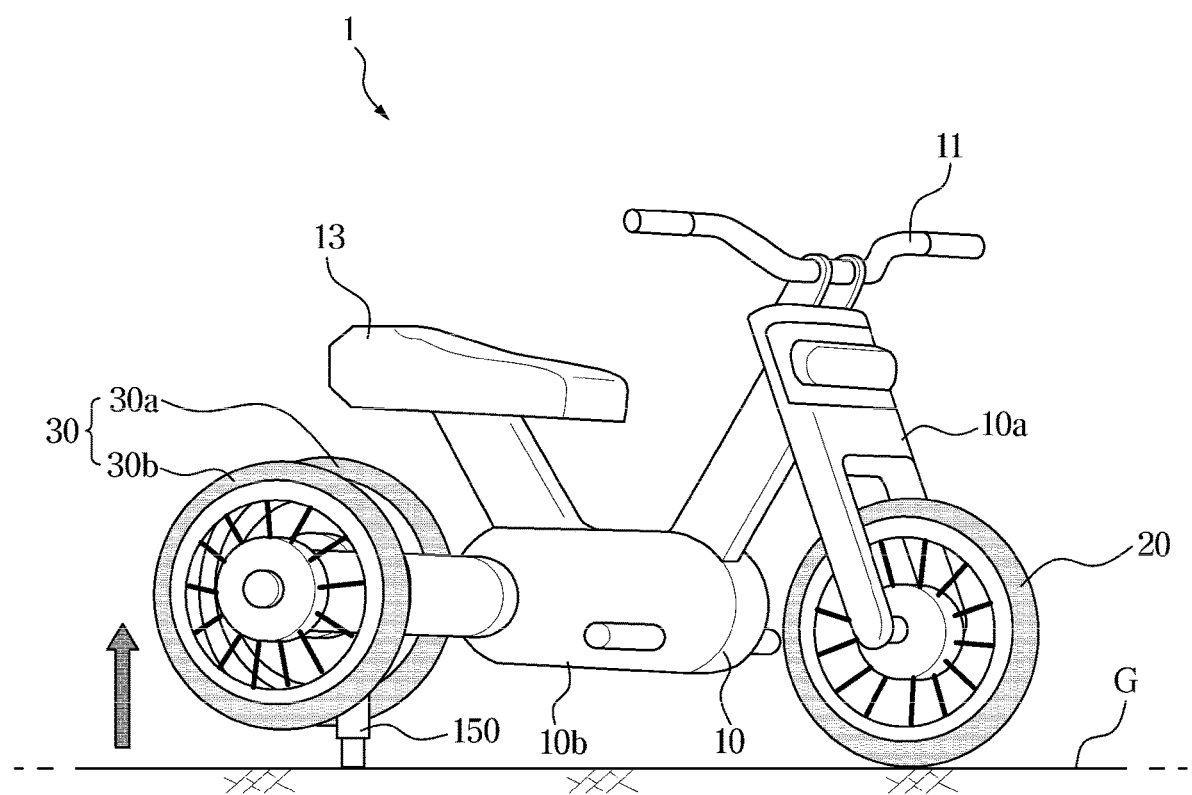
FIG. 4 is an external view of a case in which a personal mobility according to an embodiment includes a support device for separating a pair of rear wheels from a ground.

FIG. 1 is an external view of a personal mobility according to an embodiment. FIG. 2 is a top view of a case in which a personal mobility according to an embodiment adjusts a distance between a pair of rear wheels to be narrow. FIG. 3 is a top view of a case in which a personal mobility according to an embodiment adjusts a distance between a pair of rear wheels to be wide. FIG. 4 is an external view of a case in which a personal mobility according to an embodiment includes a support device for separating a pair of rear wheels from a ground.

Referring to FIGS. 1 to 3, a personal mobility 1 according to an embodiment may include a main body 10, a front wheel 20 mounted on a front end of the main body 10, and a pair of rear wheels 30a, 30b; 30 mounted on a rear end of the main body 10.

The main body 10 may include a front frame 10a connecting the steering bar 11 and the front wheel 20, and an intermediate frame 10b extending rearward from the front frame 10a and provided with a saddle 13.

The intermediate frame 10b can be extended from the front frame 10a to a pair of rear wheels 30, and the distal end of the intermediate frame 10b may be provided between the pair of rear wheels 30 to support the rear wheel 30.

On the side of the intermediate frame 10b, actuators 140a, 140b; 140 capable of adjusting the distance between the pair of rear wheels 30 may be provided. That is, the actuator 140 is provided between the intermediate frame 10b and the rear wheel 30, and may adjust the distance between the left rear wheel 30a and the right rear wheel 30b by adjusting the distance between the intermediate frame 10b and the rear wheel 30.

As shown in FIGS. 2 and 3, connecting members 14a, 14b; 14 connecting the actuator 140 and the rear wheel 30 may be provided. However, unlike shown, it is also possible for the actuator 140 to be directly connected to the hub of the rear wheel 30 according to the design change.

The actuator 140, as shown in FIG. 3, may be provided with a hydraulic cylinder, and by moving the piston 141 in the cylinder 143 according to the hydraulic control, the distance between the intermediate frame 10b and the rear wheel 30 can be adjusted. However, the type of actuator 140 is not limited to the hydraulic cylinder, and any device capable of adjusting the distance between two objects by extending its length can be included in the type of actuator 140.

Personal mobility 1 can control the actuator 140 to adjust the distance between a pair of rear wheels 30. The personal mobility 1 can decrease the distance between the pair of rear wheels 30 by controlling the actuator 140, as shown in FIG. 2. In addition, the personal mobility 1 can increase the distance between the pair of rear wheels 30 by controlling the actuator 140, as shown in FIG. 3.

Accordingly, the distance L1 between the pair of rear wheels 30 in FIG. 2 may be shorter than the distance L2 between the pair of rear wheels 30 in FIG. 3.

As shown in FIG. 2, if the distance L1 between the pair of rear wheels 30 is short, the personal mobility 1 according to an embodiment can provide driving performance such as personal mobility of two wheels including only one rear wheel as the left rear wheel 30a and the right rear wheel 30b are adjacent to each other.

In addition, personal mobility 1 according to an embodiment is, as shown in FIG. 3, if the distance L2 between the pair of rear wheels 30 is short, the left rear wheel 30a and the right rear wheel 30b As) are spaced apart from each other, it can provide driving safety, such as a three wheels personal mobility with two rear wheels.

The personal mobility 1 according to an embodiment may further include a support device 150 for pressing the ground G. When the support device 150 press the ground G, the pair of rear wheels 30 is spaced apart from the ground G.

The support device 150 may be provided on the rear end of the main body 10. For example, the support device 150 may be provided on a lower surface of the end portion of the intermediate frame 10b.

For example, the support device 150 may be provided as a hydraulic cylinder, and an extension member connected to the piston may press the ground G by moving the piston in the cylinder according to hydraulic control. However, the type of the support device 150 is not limited to the hydraulic cylinder, and any device capable of adjusting the distance between two objects by extending its length can be included in the type of support device 150.

If the support device 150 is extended and the ground G is pressed, the rear end of the personal mobility 1 is raised, so that the pair of rear wheels 30 can be separated from the ground G. In this case, the pair of rear wheels 30 does not receive frictional force from the ground G. Accordingly, it is easy to adjust the distance between the pair of rear wheels 30, and power consumption of the actuator 140 can be reduced.

In the above, the structural features of the personal mobility 1 have been described in detail. Hereinafter, it will be described that the personal mobility 1 adjusts the distance between the pair of rear wheels 30 based on at least one of user state information or external environment information.

Figure 5:
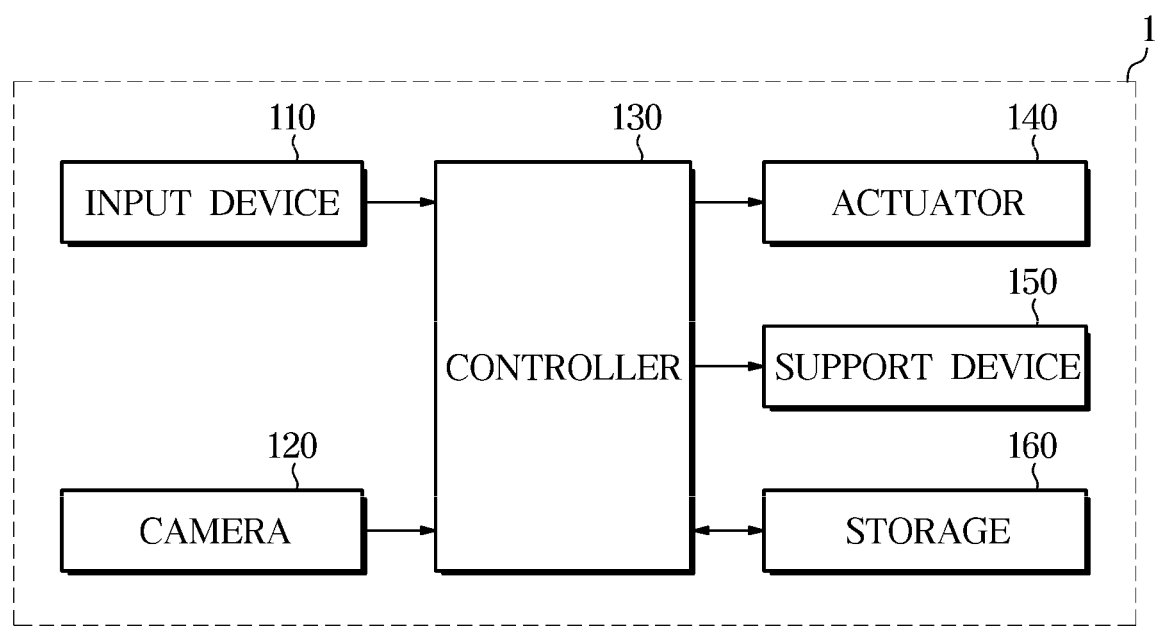
FIG. 5 is a control block diagram of a personal mobility according to an embodiment.
Figure 6:
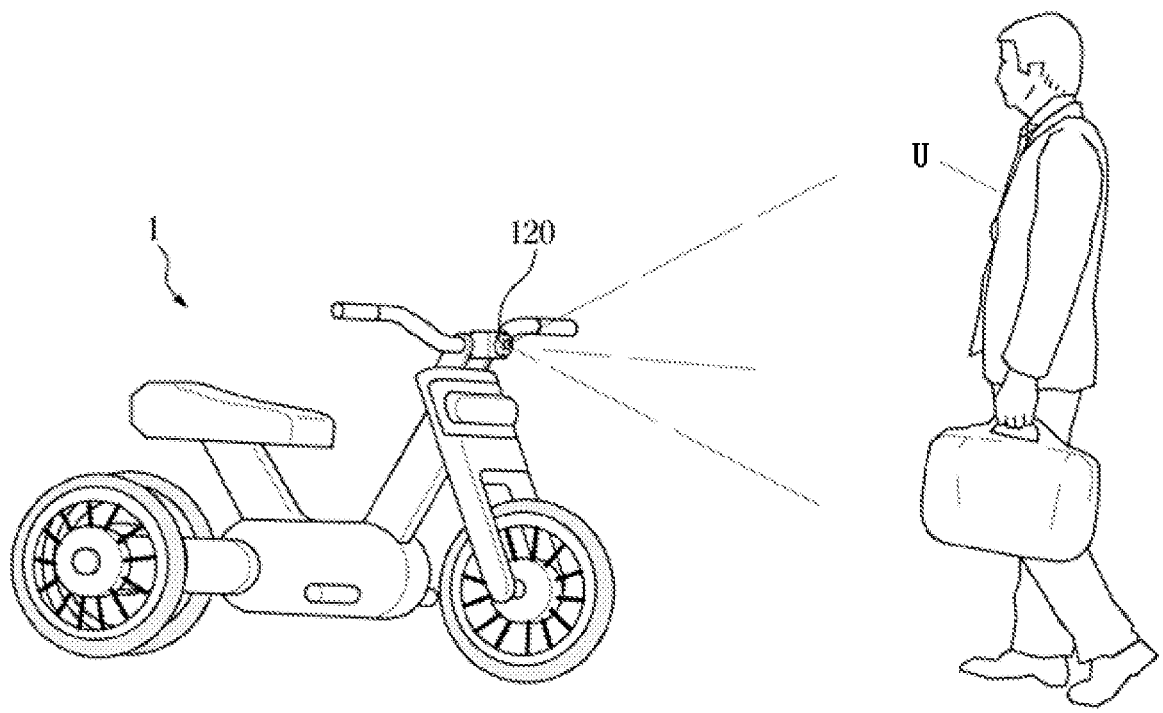
FIG. 6 is a diagram illustrating a case in which a personal mobility adjusts a distance between a pair of rear wheels based on user state information according to an embodiment.
Figure 7:
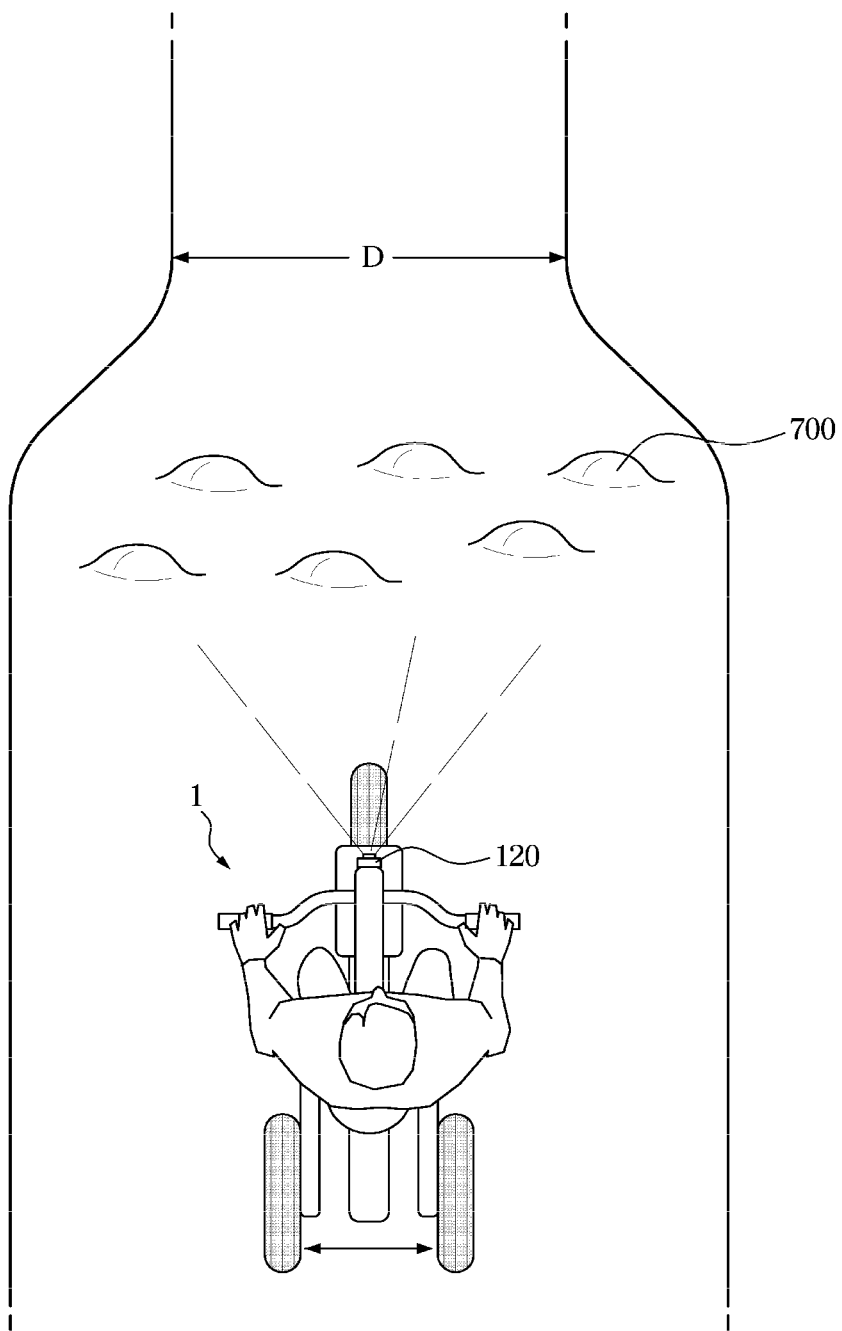
FIG. 7 is a diagram illustrating a case in which a personal mobility adjusts a distance between a pair of rear wheels based on external environment information according to an embodiment.

FIG. 5 is a control block diagram of a personal mobility according to an embodiment. FIG. 6 is a diagram illustrating a case in which a personal mobility adjusts a distance between a pair of rear wheels based on user state information according to an embodiment. FIG. 7 is a diagram illustrating a case in which a personal mobility adjusts a distance between a pair of rear wheels based on external environment information according to an embodiment. FIG. 8 is a diagram illustrating a case in which a personal mobility according to an embodiment adjusts a distance between a pair of rear wheels using a support device.

Referring to FIG. 5, personal mobility 1 according to an embodiment may include an input device 110 receiving an input from a user, a camera (an image data device) 120 acquiring image data for an external field of view, a controller 130 that controls the distance between the pair of rear wheels 30, a actuator 140 that adjusts the distance between the pair of rear wheels 30, and a support device 150 that presses the ground G so that the pair of rear wheels 30 are separated from the ground G, and a storage 160 for storing various types of information necessary for control.

The input device 110 according to an embodiment may receive a control command for adjusting a distance between a pair of rear wheels 30 from a user. The controller 130 may adjust the distance between the pair of rear wheels 30 by controlling the actuator 140 according to a control command.

The input device 110 according to an embodiment may receive an input for mode selection from a user. If receiving an input for the automatic adjustment mode from the input device 110, the controller 130 may control the actuator 140 to adjust the distance between the pair of rear wheels 30 based on image data through the camera. Hereinafter, description will be made on the premise of the automatic adjustment mode. According to an embodiment, the automatic adjustment mode may be initiated without a user input from the input device 110.

The camera 120 according to an embodiment is mounted on the personal mobility 1 so as to have a field of view outside of the personal mobility 1, and may acquire image data for the field of view outside of the personal mobility 1. The camera 120 may include a known type of image sensor.

The controller 130 according to an embodiment may determine at least one of user state information or external environment information based on image data.

Specifically, the controller 130 may acquire user state information indicating a user's state by performing image processing on image data according to a known type of image processing method. For example, the controller 130 may obtain user state information indicating the age of the user or a state in which the user grips an object by performing image processing on image data for a user.

In addition, the controller 130 may acquire external environment information indicating a state of an external environment by performing image processing on image data according to a known type of image processing method. For example, the controller 130 may obtain external environment information indicating a degree of curvature of a road surface or a width of a road by performing image processing on image data for an external field of view.

The controller 130 according to an embodiment may control the actuator 140 to adjust a distance between the pair of rear wheels 30 based on at least one of user state information or external environment information.

The controller 130 may adjust the distance between the pair of rear wheels 30 in proportion to the degree of information indicated by at least one of user state information or external environment information, according to an embodiment. That is, the controller 130 may determine a distance to be adjusted between the pair of rear wheels 30 in proportion to the degree of information indicated by at least one of user state information or external environment information.

The controller 130 may control the actuator 140 to adjust the distance between the pair of rear wheels 30 based on user state information, as shown in FIG. 6. In this case, the controller 130 may obtain user state information by processing image data of a user U accessing the personal mobility 1. According to an embodiment, the controller 130 may identify the user U according to communication between the communication module of the personal mobility 1 and a key held by the user U.

For example, the controller 130 may control the actuator 140 to increase the distance between the pair of rear wheels 30 if the age of the user U indicated by the user state information exceeds a predetermined age. At this time, the controller 130 may control the actuator 140 so that the distance between the pair of rear wheels 30 increases in proportion to the age of the user U. Through this, the personal mobility 1 can provide driving safety, such as a three wheels personal mobility, to an elderly user U.

In addition, the controller 130 may control the actuator 140 so that the distance between the pair of rear wheels 30 increases if the user state information indicates a state in which the user U grips the object. At this time, the controller 130 may control the actuator 140 such that the distance between the pair of rear wheels 30 increases in proportion to the size of the object gripped by the user U. Through this, the personal mobility 1 can provide a space between the pair of rear wheels 30 as an object loading space.

The controller 130 may control the actuator 140 to adjust the distance between the pair of rear wheels 30 based on external environment information, as shown in FIG. 7. In this case, the controller 130 may obtain external environment information by processing image data on the external environment of the personal mobility 1.

For example, if the degree of curvature of the road surface 700 indicated by external environment information exceeds a predetermined degree of curvature, the controller may control the actuator 140 to increase the distance between the pair of rear wheels 30. At this time, the controller 130 may control the actuator 140 such that the distance between the pair of rear wheels 30 increases in proportion to the degree of curvature of the road surface 700. Through this, the personal mobility 1 may provide driving safety such as a personal mobility of three wheels if the degree of curvature of the road surface 700 is severe.

In addition, the controller 130 may control the actuator 140 such that the distance between the pair of rear wheels 30 decreases if the width D of the road indicated by the external environment information decreases. At this time, the controller 130 may control the actuator 140 to adjust the distance between the pair of rear wheels 30 in proportion to the width D of the road. The personal mobility 1 can adaptively adjust the driving performance of the personal mobility 1 to suit the external environment by adjusting the distance between the pair of rear wheels 30 in response to the width D of the road if the width D of the road becomes narrow.

The controller 130 according to an embodiment may control the support device 150 so that the pair of rear wheels 30 are separated from the ground G in the case of controlling the actuator 140 to adjust the distance between the pair of rear wheels 30 while the personal mobility 1 is parked. That is, the controller 130 may adjust the distance between the pair of rear wheels 30 after the pair of rear wheels 30 is separated from the ground G according to the operation of the support device 150. In this case, the pair of rear wheels 30 does not receive frictional force from the ground G. Accordingly, it is easy to adjust the distance between the pair of rear wheels 30, and power consumption of the actuator 140 can be reduced.

The controller 130 may determine whether to use the support device 150 according to an adjustment width of a distance between the pair of rear wheels 30 according to an embodiment. That is, as shown in FIG. 8, if the difference between the current distance between the pair of rear wheels 30 and the determined distance to be adjusted is less than a predetermined value while the personal mobility 1 is parked, the controller 130 may control the actuator 150 while the support device 150 does not press the ground G. On the other hand, if the difference between the current distance between the pair of rear wheels 30 and the determined distance to be adjusted while the personal mobility 1 is parked is greater than or equal to a predetermined value, the controller 130 may control the actuator 150 while the support device 150 presses the ground (G).

In addition, as shown in FIG. 8, in the case of controlling the actuator 140 to adjust the distance between the pair of rear wheels 30 while the personal mobility 1 is driving, the controller 130 may not use the support device 150.

Hereinafter, a control method of a personal mobility 1 in some forms of the present disclosure will be described. The personal mobility 1 according to an embodiment may be applied to the control method of the personal mobility 1 to be described later. Accordingly, the contents described above with reference to FIGS. 1 to 9 are equally applicable to the control method of the personal mobility 1 in some forms of the present disclosure, even if there is no special mention.

Figure 9:
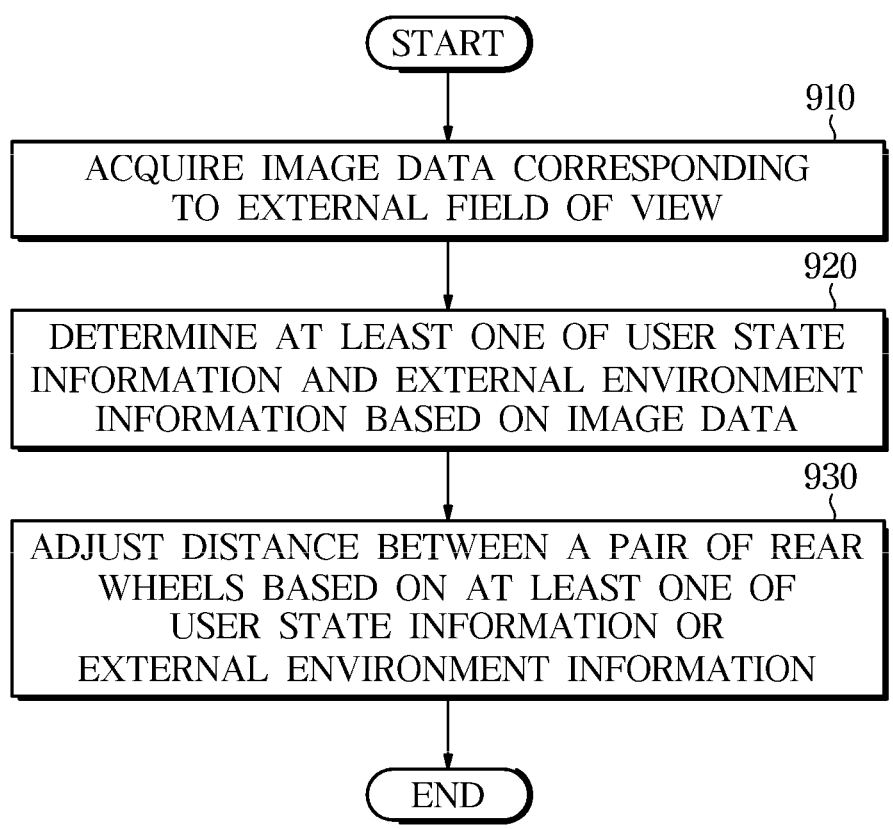
FIG. 9 is a flowchart illustrating a case of adjusting a distance between a pair of rear wheels in a control method of a personal mobility according to an embodiment.

FIG. 9 is a flowchart illustrating a case of adjusting a distance between a pair of rear wheels in a control method of a personal mobility according to an embodiment.

Referring to FIG. 9, the personal mobility 1 according to an embodiment acquires image data corresponding to an external field of view (910). The personal mobility 1 according to an embodiment may determine at least one of user state information and external environment information based on image data (920). That is, the controller 130 may determine at least one of user state information and external environment information based on image data.

Specifically, the controller 130 may acquire user state information indicating a user's state by performing image processing on image data according to a known type of image processing method. For example, the controller 130 may obtain user state information indicating the age of the user or a state in which the user grips an object by performing image processing on image data for a user.

In addition, the controller 130 may acquire external environment information indicating a state of an external environment by performing image processing on image data according to a known type of image processing method. For example, the controller 130 may obtain external environment information indicating a degree of curvature of a road surface or a width of a road by performing image processing on image data for an external field of view.

The personal mobility 1 according to an embodiment may adjust a distance between a pair of rear wheels 30 based on at least one of user state information or external environment information (930).

For example, the controller 130 may control the actuator 140 to increase the distance between the pair of rear wheels 30 if the age of the user U indicated by the user state information exceeds a predetermined age. At this time, the controller 130 may control the actuator 140 so that the distance between the pair of rear wheels 30 increases in proportion to the age of the user U. Through this, the personal mobility 1 can provide driving safety, such as a three wheels personal mobility, to an elderly user U.

In addition, the controller 130 may control the actuator 140 so that the distance between the pair of rear wheels 30 increases if the user state information indicates a state in which the user U grips the object. At this time, the controller 130 may control the actuator 140 such that the distance between the pair of rear wheels 30 increases in proportion to the size of the object gripped by the user U. Through this, the personal mobility 1 can provide a space between the pair of rear wheels 30 as an object loading space.

For example, if the degree of curvature of the road surface 700 indicated by external environment information exceeds a predetermined degree of curvature, the controller may control the actuator 140 to increase the distance between the pair of rear wheels 30. At this time, the controller 130 may control the actuator 140 such that the distance between the pair of rear wheels 30 increases in proportion to the degree of curvature of the road surface 700. Through this, the personal mobility 1 may provide driving safety such as a personal mobility of three wheels if the degree of curvature of the road surface 700 is severe.

In addition, the controller 130 may control the actuator 140 such that the distance between the pair of rear wheels 30 decreases if the width D of the road indicated by the external environment information decreases. At this time, the controller 130 may control the actuator 140 to adjust the distance between the pair of rear wheels 30 in proportion to the width D of the road. The personal mobility 1 can adaptively adjust the driving performance of the personal mobility 1 to suit the external environment by adjusting the distance between the pair of rear wheels 30 in response to the width D of the road if the width D of the road becomes narrow.

Figure 10:
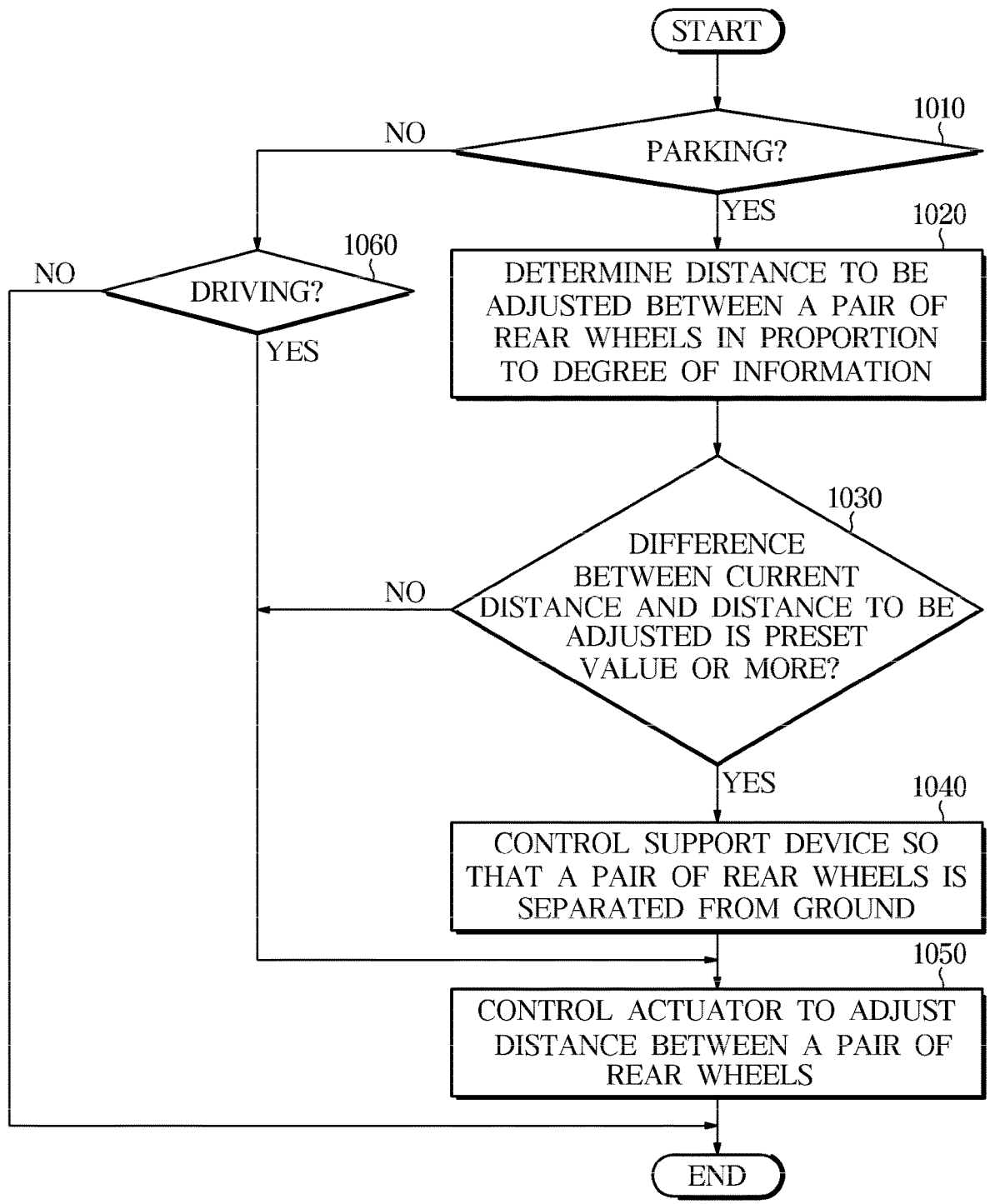
FIG. 10 is a flowchart illustrating a case of adjusting a distance between a pair of rear wheels using a support device in a control method of a personal mobility according to an embodiment.

FIG. 10 is a flowchart illustrating a case of adjusting a distance between a pair of rear wheels using a support device in a control method of a personal mobility according to an embodiment.

Referring to FIG. 10, when parking (YES in 1010), the personal mobility 1 according to an embodiment may determine a distance to be adjusted between a pair of rear wheels 30 in proportion to the degree of information (1020). That is, the controller 130 may determine a distance to be adjusted between the pair of rear wheels 30 in proportion to the degree of information indicated by at least one of user state information or external environment information.

If the difference between the current distance and the distance to be adjusted between the pair of rear wheels 30 is a predetermined value or more (YES in 1030), the personal mobility 1 according to an embodiment may control the support device 150 so that the pair of rear wheels 30 is separated from the ground G (1040), and may control the actuator 140 to adjust the distance between the pair of rear wheels 30 (1050).

In addition, if the difference between the current distance and the distance to be adjusted between the pair of rear wheels 30 is less than a predetermined value (NO in 1030), the personal mobility 1 according to an embodiment may control the actuator 140 to adjust the distance between the pair of rear wheels 30 without controlling the support device 150 (1050).

In addition, when driving (YES in 1060), the personal mobility 1 according to an embodiment may control the actuator 140 to adjust the distance between the pair of rear wheels 30 (1050).

According to a personal mobility and a control method thereof according to an aspect of present disclosure, by providing a pair of rear wheels and adjusting the distance between the pair of rear wheels according to the external environment or user state, the driving performance and driving safety can be adaptively adjusted.

Meanwhile, some forms of the present disclosure may be implemented in the form of a recording medium storing instructions that are executable by a computer. The instructions may be stored in the form of a program code, and when executed by a processor, the instructions may generate a program module to perform operations of some forms of the present disclosure. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The exemplary forms of the disclosure have thus far been described with reference to the accompanying drawings. It will be obvious to those of ordinary skill in the art that the disclosure may be practiced in other forms than the exemplary forms as described above without changing the technical idea or essential features of the disclosure. The above exemplary forms are only by way of example, and should not be interpreted in a limited sense.

What is claimed is:

1. A personal mobility device comprising:
a main body;
a front wheel mounted on a front end of the main body;
a pair of rear wheels mounted on a rear end of the main body;
an actuator configured to adjust a distance between the pair of rear wheels;
an image data device mounted on the personal mobility device and configured to acquire an image data of an outside of the personal mobility device; and
a controller configured to:
determine user state information or external environment information based on the image data, wherein the user state information includes a state of whether a user grips an object and the external environment information includes a degree of curvature of a road surface or a width of a road; and
control the actuator to adjust the distance between the pair of rear wheels based on the user state information or the external environment information.

2. The personal mobility device according to claim 1, the controller is configured to determine the user state information based on the image data and to control the actuator based on the user state information.

3. The personal mobility device according to claim 2, wherein the controller is configured to control the actuator to increase the distance between the pair of rear wheels when the user state information indicates the state in which the user grips the object.

4. The personal mobility device according to claim 1, the controller is configured to determine the external environment information based on the image data and to control the actuator based on the external environment information.

5. The personal mobility device according to claim 4, wherein the controller is configured to control the actuator to increase the distance between the pair of rear wheels when the degree of curvature of the road surface indicated by the external environment information is greater than a predetermined degree of curvature.

6. The personal mobility device according to claim 4, wherein the controller is configured to control the actuator to decrease the distance between the pair of rear wheels when the width of the road indicated by the external environment information decreases.

7. A personal mobility device comprising:
a main body;
a front wheel mounted on a front end of the main body;

a pair of rear wheels mounted on a rear end of the main body;

an actuator;

an image data device mounted on the personal mobility device;

a support device mounted on the rear end of the main body, wherein the support device is extended to separate the pair of rear wheels from a ground and configured to press the ground; and a controller configured to determine user state information or external environment information based on image data received from the image data device and to control the actuator to adjust the distance between the pair of rear wheels based on the user state information or the external environment information.

8. The personal mobility device according to claim 7, wherein the controller is configured to control the support device to separate the pair of rear wheels from the ground when the personal mobility device is parked and the actuator is configured to adjust the distance between the pair of rear wheels.

9. The personal mobility device according to claim 8, wherein the controller is configured to control the actuator to adjust the distance between the pair of rear wheels after the pair of rear wheels are separated from the ground.

10. The personal mobility device according to claim 7, wherein the controller is configured to control the actuator in a state in which the support device does not press the ground when a difference between the pair of rear wheels and the distance to be adjusted is less than a predetermined value while the personal mobility device is parked.

11. A control method of a personal mobility device comprising:

determining user state information or external environment information based on image data, wherein the user state information includes a state of whether a user grips an object and the external environment information includes a degree of curvature of a road surface or a width of a road; and controlling an actuator to adjust a distance between a pair of rear wheels based on the user state information or the external environment information.

12. The control method according to claim 11, further comprising:

separating, by a support device mounted on a rear end of a main body, the pair of rear wheels from a ground; and pressing, by the support device, the ground.

13. The control method according to claim 12, further comprising controlling the support device to separate the pair of rear wheels from the ground when the personal mobility device is parked and the distance between the pair of rear wheels is adjusted.

14. The control method according to claim 13, further comprising controlling the actuator to adjust the distance between the pair of rear wheels after the pair of rear wheels are separated from the ground.

15. The control method according to claim 12, further comprising:

controlling the actuator in a state in which the support device does not press the ground when a difference between the pair of rear wheels and the distance to be adjusted is less than a predetermined value while the personal mobility device is parked.

16. The control method according to claim 11, wherein determining the user state information or the external environment information comprises determining the user state information; and wherein controlling the actuator comprises controlling the actuator to adjust the distance between the pair of rear wheels based on the user state information.

17. The control method according to claim 16, wherein controlling the actuator comprises controlling the actuator to increase the distance between the pair of rear wheels when the user state information indicates the state in which the user grips the object.

18. The control method according to claim 11, wherein determining the user state information or the external environment information comprises determining the external environment information; and wherein controlling the actuator comprises controlling the actuator to adjust the distance between the pair of rear wheels based on the external environment information.

19. The control method according to claim 18, wherein controlling the actuator comprises controlling the actuator to increase the distance between the pair of rear wheels when the degree of curvature of the road surface indicated by the external environment information is greater than a predetermined degree of curvature.

20. The control method according to claim 18, wherein controlling the actuator comprises controlling the actuator to decrease the distance between the pair of rear wheels when the width of the road indicated by the external environment information decreases.

* * * * *